(12) United States Patent
Huang et al.

(10) Patent No.: US 10,137,796 B2
(45) Date of Patent: Nov. 27, 2018

(54) CONTROL SYSTEM FOR ELECTRIC VEHICLE CHARGING STATION AND METHOD THEREOF

(71) Applicant: ABB Schweiz AG, Baden (CH)

(72) Inventors: Xing Huang, Beijing (CN); Rongrong Yu, Beijing (CN); Yao Chen, Beijing (CN); Hector Zelaya De La Parra, Vasteras (SE)

(73) Assignee: ABB Schweiz AG, Baden (CH)

( * ) Notice: Subject to any disclaimer, the term of this patent is extended or adjusted under 35 U.S.C. 154(b) by 91 days.

(21) Appl. No.: 14/896,170

(22) PCT Filed: Oct. 31, 2014

(86) PCT No.: PCT/CN2014/090045
§ 371 (c)(1),
(2) Date: Dec. 4, 2015

(87) PCT Pub. No.: WO2016/065616
PCT Pub. Date: May 6, 2016

(65) Prior Publication Data
US 2016/0167539 A1    Jun. 16, 2016

(51) Int. Cl.
*H02J 7/00*    (2006.01)
*B60L 11/18*    (2006.01)
(Continued)

(52) U.S. Cl.
CPC ....... *B60L 11/1851* (2013.01); *B60L 11/1842* (2013.01); *B60L 11/1844* (2013.01);
(Continued)

(58) Field of Classification Search
CPC .............. B60L 11/1842; B60L 11/1844; B60L 11/1851; B60L 2240/70; B60L 2240/80;
(Continued)

(56) References Cited

U.S. PATENT DOCUMENTS 8,478,452 B2 *  7/2013  Pratt ..................... H01M 10/44
                                                320/128
8,872,379 B2 * 10/2014  Ruiz .................. B60L 11/1816
                                                307/66
(Continued)

FOREIGN PATENT DOCUMENTS

CN    202309103 U    7/2012
CN    203204391 U    9/2013
(Continued)

OTHER PUBLICATIONS

ISA/CN International Search Report dated Jul. 24, 2014 re PCT Application No. PCT/CN2014/090045, filed Oct. 31, 2014.
(Continued)

*Primary Examiner* — Helen Rossoshek
(74) *Attorney, Agent, or Firm* — J. Bruce Schelkopf; Taft Stettinius & Hollister LLP (57) ABSTRACT

A control system for an electric vehicle charging station (EVCS) is provided, the control system comprises: a central controller configured to receive an ancillary service order from a power grid and distribute the ancillary service order to one or more local controllers periodically; and the one or more local controllers configured to control a plurality of electric vehicle supply devices based on the distributed ancillary service order in real time. The method controlling the electric vehicle charging station (EVCS) is also provided.

31 Claims, 6 Drawing Sheets

(51) Int. Cl.
*H02J 3/14* (2006.01)
*H02J 3/32* (2006.01)
*H02J 3/38* (2006.01)
*H02J 13/00* (2006.01)

(52) U.S. Cl.
CPC ............. B60L 11/1861 (2013.01); *H02J 3/14*
(2013.01); *H02J 3/32* (2013.01); *H02J 3/38*
(2013.01); *H02J 7/0027* (2013.01); *H02J*
*13/0006* (2013.01); *Y02B 70/3225* (2013.01);
*Y02E 60/721* (2013.01); *Y02T 10/7055*
(2013.01); *Y02T 90/168* (2013.01); *Y04S*
*10/126* (2013.01); *Y04S 20/222* (2013.01);
*Y04S 30/12* (2013.01)

(58) Field of Classification Search
CPC ........ H02J 13/0013; H02J 3/24; H02J 7/0021;
H02J 15/00; H02J 3/00; H02J 3/14; H02J
3/0006; H02J 7/0027; Y02T 10/7088;
Y02T 90/163; Y02T 90/16; Y02T 90/168
See application file for complete search history.

(56) References Cited

U.S. PATENT DOCUMENTS

| | | | | |
|---|---|---|---|---|
| 9,630,511 | B2* | 4/2017 | Higashi | B60L 11/18 |
| 2009/0200988 | A1* | 8/2009 | Bridges | G06Q 50/06 |
| | | | | 320/137 |
| 2010/0017045 | A1* | 1/2010 | Nesler | B60L 11/1824 |
| | | | | 700/296 |
| 2010/0134067 | A1* | 6/2010 | Baxter | B60L 3/0084 |
| | | | | 320/109 |
| 2010/0211643 | A1* | 8/2010 | Lowenthal | B60L 3/0069 |
| | | | | 709/206 |
| 2011/0153474 | A1* | 6/2011 | Tormey | G06Q 20/40 |
| | | | | 705/31 |
| 2011/0191265 | A1* | 8/2011 | Lowenthal | B60L 3/12 |
| | | | | 705/412 |
| 2011/0245987 | A1* | 10/2011 | Pratt | H01M 10/44 |
| | | | | 700/295 |
| 2011/0276194 | A1* | 11/2011 | Emalfarb | B60L 11/1838 |
| | | | | 700/297 |
| 2012/0086396 | A1 | 4/2012 | Pan et al. | |
| 2013/0179061 | A1* | 7/2013 | Gadh | B60L 11/1842 |
| | | | | 701/123 |
| 2013/0211988 | A1* | 8/2013 | Dorn | B60L 11/1838 |
| | | | | 705/35 |
| 2013/0229149 | A1 | 9/2013 | Sortomme | |
| 2014/0200724 | A1 | 7/2014 | Sortomme | |
| 2015/0256002 | A1* | 9/2015 | Yonetani | H02J 3/32 |
| | | | | 320/150 |
| 2017/0005515 | A1* | 1/2017 | Sanders | H02J 3/381 |

FOREIGN PATENT DOCUMENTS

| | | |
|---|---|---|
| CN | 103915869 A | 7/2014 |
| EP | 2910404 A1 | 8/2015 |
| GB | 2479418 A | 10/2011 |
| JP | 2002078227 A | 3/2002 |
| JP | 2012060833 A | 3/2012 |
| JP | 2012085511 A | 4/2012 |
| JP | 2012160803 A | 8/2012 |
| JP | 2013041324 A | 2/2013 |
| WO | 2012119300 A1 | 9/2012 |
| WO | 2013121291 A2 | 8/2013 |
| WO | WO2014121794 A1 | 8/2014 |

OTHER PUBLICATIONS

Canadian Office Action, Patent Application No. 2,911,907, dated Dec. 8, 2016, 8 pages.
Japanese Office Action, Patent Application No. 2016-555879, dated Feb. 28, 2017, 14 pages with English Translation.
Extended European Search Report, European Patent Application No. 14895489.4, dated Oct. 20, 2017, 11 pages.
First Japanese Office Action, Japanese Patent Application No. 2016-555879, dated Oct. 24, 2017, 14 pages, English Language Translation Provided.
First Chinese Office Action, Chinese Patent Application No. 201480031980.X, dated Oct. 10, 2017, 12 pages, English Language Translation Provided.
Chinese Search Report, Chinese Patent Application No. 201480031980. X, dated Oct. 10, 2017, 4 pages, English Language Translation Provided.
Eric Sortomme; Mohamed A. El-Sharkawi, Optimal Scheduling of Vehicle-to-Grid Energy and Ancillary Services, IEEE Transactions on Smart Grid, vol. 3, No. 1. Mar. 2012, pp. 351-359.

* cited by examiner

CONTROL SYSTEM FOR ELECTRIC VEHICLE CHARGING STATION AND METHOD THEREOF

FIELD OF INVENTION

Embodiments of the present disclosure generally relate to an electric vehicle charging station. More particularly, embodiments of the present disclosure relate to a control system for electric vehicle charging station (EVCS) and a method for controlling the electric vehicle station charging system.

BACKGROUND OF INVENTION

Facing urgent environmental pressure and shortage of energy resources, lots of efforts have been put to shift people life behavior to more environment-friendly and less resources-dependent. Under such situation, electric vehicle (EV) is regarded as an emerging strategic industry in many countries nowadays. Foreseen large amount of EV deployment, there will be great demand for EVCS installation.

It is known that EV charging will dramatically influence a power grid performance without proper control. The electric vehicle ancillary service (AS) supports the transmission of electric power from the electric vehicle to the power grid given obligations of control areas and transmitting utilities within those control areas to maintain reliable operations of the interconnected transmission system. However, if the EVCS can provide certain types of ancillary services to power grid besides just absorbing power to charge an EV, it can not only mitigate a negative impact on grid, but also can enhance the power grid operation stability, and reduce the pressure on grid capacity expansion. The power provided by the electric vehicle ancillary service could be bidirectional, in other words, the power can flow from the electric vehicle to the power grid, and sometimes the power can also flow from the power grid to the electric vehicle. When the EVCS does not provide ancillary service, the power absorbed by the EVCS is determined by the requirement of the electric vehicle demand, and this process belongs to passive response and there is no active regulation in the EVCS. Moreover, when the EVCS provides ancillary service, the power absorbed by the EVCS should consider both the requirement of the electric vehicle and a scheduling requirement of the power grid, in this case, the EVCS has active regulation function in order to improve stability of the power system. In another word, when the EVCS absorbs power from the power grid, it can absorb more power or less power than the EV's requirement in view of the power grid demand; and when the EVCS feeds power to the power grid, it also can regulate the power according to the power grid demand. Through properly designing the control algorithm and implementing in hardware, the ancillary service provision is technically feasible.

SUMMARY OF INVENTION

In order to address the foregoing and other potential problems, embodiments of the present disclosure proposes a control system for an electric vehicle station charging system and a method for controlling the electric vehicle station charging system.

In one aspect, embodiments of the present disclosure provide a control system for an electric vehicle charging station (EVCS). The control system comprises: a central controller configured to receive an ancillary service order from a power grid and distribute the ancillary service order to one or more local controllers periodically; and the one or more local controllers configured to control a plurality of electric vehicle supply devices based on the distributed ancillary service order in real time.

In some embodiments, the central controller is further configured to evaluate a required energy of batteries in each electric vehicle for charging and an available capacity for ancillary service.

In some embodiments, the central controller is further configured to distribute the ancillary service order to the plurality of electric vehicle supply devices according to a required energy of batteries in each electric vehicle for charging and the evaluated available capacity value for ancillary service.

In some embodiments, the available capacity for ancillary service comprises an available energy of the batteries in each electric vehicle and an available power of each electric vehicle supply device.

In some embodiments, the central controller is further configured to divide an ancillary service period into an ancillary service providing time and a battery charging time for each electric vehicle supply device.

In some embodiments, the ancillary service period is flexibly configured.

In some embodiments, a sequence of the ancillary service providing time and the battery charging time in each ancillary service period is flexibly configured.

In some embodiments, the battery charging time is at end of the ancillary service period, or at beginning of the ancillary service period, or at arbitrary part of the ancillary service period.

In some embodiments, the central controller is further configured to prepare for ancillary service by regulating energy in the batteries of the electric vehicles during intervals when the ancillary service order is zero in the ancillary service providing time.

In some embodiments, the central controller is further configured to set a fixed time used for battery charging in every ancillary service period.

In some embodiments, the fixed time is a function of a final energy requirement by the customers, a state of charge (SOC) of battery, a maximum power capacity of the electric vehicle supply device, and mathematical statistics of time length for the ancillary service in one ancillary service period.

In some embodiments, the central controller is configured to operate the electric vehicle supply devices at a de-rating operation mode by considering a battery capacity based on an operation condition and a battery type.

In some embodiments, the operation condition comprises temperature and a life time of battery.

In some embodiments, the central controller is configured to use a closed loop control of active and reactive power with an energy storage system (ESS) to improve power supply quality which is affected by power fluctuations at a point of common coupling (PCC).

In some embodiments, the central controller is located in a substation, or located in a master electric vehicle supply device of the plurality of electric vehicle supply devices, or located in a control room or on a control platform.

In some embodiments, the one or more local controllers take demands of customers as inputs, and wherein the demands of customers comprise at least one of: a willingness to participate in ancillary service, an expected time to stay in the EVCS, and a desired value of energy storage in batteries of the electric vehicles when customers leave.

In some embodiments, the central controller is configured to communicate with the one or more local controllers with different communication protocols.

In some embodiments, the electric vehicle supply devices comprise unidirectional electric vehicle supply devices and bidirectional electric vehicle supply devices.

In another aspect, embodiments of the present disclosure provide a method for controlling an electric vehicle charging station (EVCS). The method comprises: receiving an ancillary service order from a power grid; distributing the ancillary service order to one or more lower level controllers periodically; and controlling a plurality of electric vehicle supply devices based on the distributed ancillary service order in real time.

In some embodiments, the method further comprises evaluating a required energy of batteries in each electric vehicle for charging and an available capacity value for ancillary service.

In some embodiments, distributing the ancillary service order to the one or more lower level controllers periodically further comprises distributing the ancillary service order to a plurality of electric vehicle supply devices according to a required energy of batteries in each electric vehicle for charging and the evaluated available capacity value for ancillary service.

In some embodiments, the available capacity for ancillary service comprises an available energy of the batteries in each electric vehicle and an available power of each electric vehicle supply device.

In some embodiments, the method further comprises further comprising: dividing an ancillary service period into ancillary service providing time and battery charging time for each electric vehicle supply device.

In some embodiments, the ancillary service period is flexibly configured.

In some embodiments, a sequence of the ancillary service providing time and the battery charging time in each ancillary service period is flexibly configured.

In some embodiments, the battery charging time is at the end of the ancillary service period, or at the beginning of the ancillary service period, or at arbitrary part of the ancillary service period.

In some embodiments, the method further comprises: preparing for ancillary service by regulating energy in batteries of the electric vehicles during intervals when the ancillary service order is zero in the ancillary service providing time.

In some embodiments, the method further comprises: setting a fixed time used for battery charging in every ancillary service period.

In some embodiments, the fixed time is a function of a final energy requirement by the customers, a state of charge (SOC) of battery, a maximum power capacity of electric vehicle supply device, and mathematical statistics of time length for the ancillary service in one ancillary service period.

In some embodiments, the method further comprises: operating the electric vehicle supply device at a de-rating operation mode by considering a battery capacity based on an operation condition and a battery type.

In some embodiments, the operation condition comprises temperature and a life time of battery.

In some embodiments, the method further comprises: using a closed loop control with an energy storage system (ESS) to improve power supply quality which is affected by power fluctuations at a point of common coupling (PCC).

In some embodiments, the method further comprises: taking demands of customers as inputs, wherein the demands of customers comprise at least one of: a willingness to participate in ancillary service, an expected time to stay in the EVCS, and a desired value of energy storage in batteries of the electric vehicles when customers leave.

In some embodiments, the method further comprises: controlling the plurality of electric vehicle supply devices with different communication protocols.

In some embodiments, the electric vehicle supply devices comprise unidirectional electric vehicle supply devices and bidirectional electric vehicle supply devices.

Other features and advantages of embodiments of the present disclosure will also be understood from the following description of specific exemplary embodiments when read in conjunction with the accompanying drawings, which illustrate, by way of example, the principles of the disclosure.

BRIEF DESCRIPTION OF DRAWINGS

Embodiments of the present disclosure will be presented in the sense of examples and their advantages are explained in greater detail below, with reference to the accompanying drawings, wherein.

All the figures are schematic, not necessarily to scale, and generally only show parts which are necessary in order to elucidate the disclosure, wherein other parts may be omitted or merely suggested.

DETAILED DESCRIPTION OF EMBODIMENTS

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
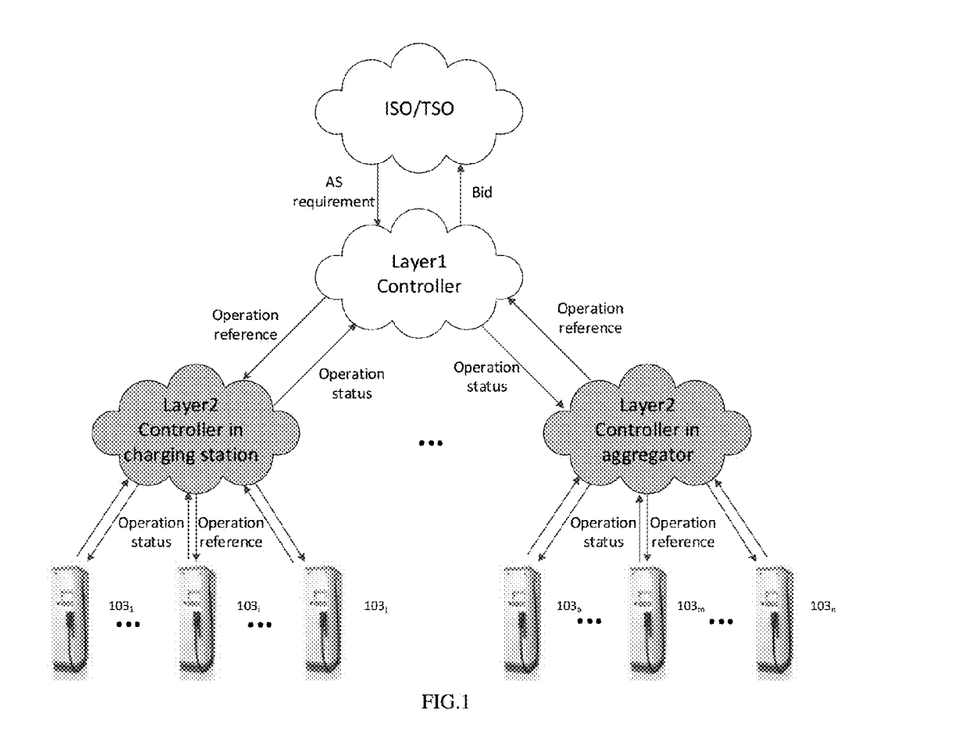
FIG. 1 shows architecture of EVCS (or EV aggregator) to participate in ancillary services.

FIG. 1 shows the architecture of EVCS (or EV aggregator) to participate in ancillary services, and especially the communication relationships and control levels between different controllers. As shown in FIG. 1, a control system of layer 1 may receive ancillary services requirements from the ISO/TSO (independent system operator/transmission system operator) and bid for the ancillary services. Furthermore, the control system of layer 1 may send operation reference for EVCS (or EV aggregator, wherein an aggregator is a business entity that manages a plurality of electric vehicles) to a control system of layer 2 and obtain the operation status of the EVCS. The control system of layer 2 may control a plurality of electric vehicle supply devices $103_i, 103_j, \ldots 103_n$ which can be used to charge the EV and provide ancillary services, and receive the operation status of the plurality of the electric vehicle supply devices. This subject matter mainly relates to the control system of layer 2, thus the control system of layer 1 is omitted herein in order to avoid obscuring.

Figure 2:
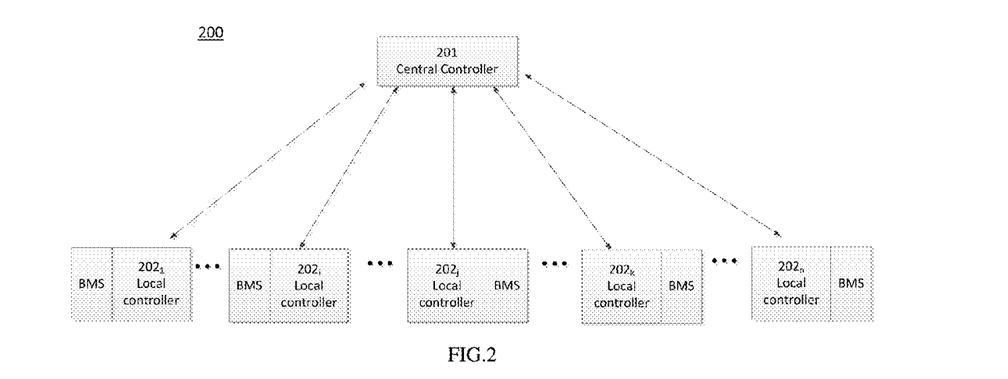
FIG. 2 is a diagram illustrating the structure of an electric vehicle control system.

FIG. 2 is a diagram illustrating the structure of a control system 200 for an electric vehicle charging station. The control system 200 can provide the ancillary services in real time response of AS order from the power grid. The EVCS control system 200 can be station based or aggregator based, and can manage the ancillary service orders during every ancillary service period, wherein the ancillary service order defines the amount of electric power should be transmitted to/from a connected power grid. As shown in FIG. 2, the EVCS 200 comprises a central controller 201 which will be discussed below with reference to FIG. 3 and several local controllers $202_i, \ldots 202_n$ (collectively referred to as "local controllers 202"). There are a plurality of EV supply devices in the EVCS, which correspond to the several local controllers $202_i, \ldots 202_n$ respectively. Each of the EV supply devices may be provided with a battery management system (BMS).

The central controller 201 is configured to receive an ancillary service order from a power grid and distribute the ancillary service order to one or more local controllers $202_i, \ldots 202_n$ periodically. The ancillary service order will be updated for every ancillary service period. The period is defined by the power grid or the obligations between the EVCS and the power grid. In some embodiments, the ancillary service period is 1 hour.

The one or more local controllers $202_i, \ldots 202_a$ are configured to control a plurality of electric vehicle supply devices based on the distributed ancillary service order in real time. Wherein the electric vehicle supply devices are used to charge corresponding electric vehicles.

In some embodiments, the central controller is configured to communicate with the one or more local controllers with different communication protocols.

In some embodiments, the central controller 201 can be located in the substation. When the EVCS is small with relatively small number of the supply devices, the central controller 201 can be located in one master EV supply device to simply the system architecture. In another embodiment, the central controller 201 can be located in one control room, or control platform, when the EVCS is big with lots of supply devices. In this way, the system can be more stable since the system will not shut down when the master EV supply device faults.

The local controllers $202_i, \ldots 202_n$ fulfills the EV battery charging requirement while contributing to the ancillary service order. Moreover, the local controllers $202_i, \ldots 202_n$ take the customer demands as inputs. For example, the customer demands may comprise a willingness to participate in AS, an expected time to stay in the Charge Station, and/or the desired value of energy storage in electric vehicles' battery when the customers leave.

In one embodiment, the central controller is further configured to evaluate a required energy of batteries in each electric vehicle for charging and an available capacity for ancillary service, and to distribute the ancillary service order to the plurality of electric vehicle supply devices according to a required energy of batteries in each electric vehicle for charging and the evaluated available capacity value for ancillary service. Moreover, the available capacity for ancillary service comprises available energy of the batteries in each electric vehicle and available power of each electric vehicle supply device.

The required energy of batteries in one electric vehicle is limited by the battery available capacity, the central controller should judge whether the required energy of batteries in one electric vehicle which is set by the electric vehicle's owner (i.e. the customer) can be afforded, and give the required energy of batteries a value limitation operation. Furthermore, when the EV battery can't store the required energy, the central controller may output an error signal. In this case, the customer should decrease the required battery exchanged energy until it fits the battery available capacity.

Figure 3:
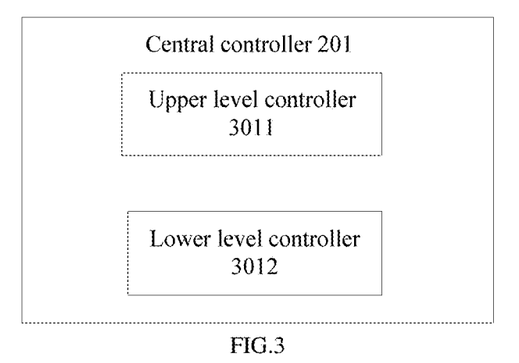
FIG. 3 is a diagram illustrating a central controller according to an embodiment of the present disclosure.

Furthermore, based on the required energy of batteries in one electric vehicle, the central controller 3011 can determine whether the electric vehicle supply device can provide the required power. In some cases, if the power required by the electric vehicle exceeds the electric vehicle supply device's capacity, the central controller will output an error signal and the electric vehicle's owner should decrease the required energy or increase the time he parks in the EVCS.

There are two targets each of the electric vehicle supply devices aims at. Target one is to provide AS power in real-time response; and target two is to guarantee energy storage according to the customer requirements. The problem is that these two targets have conflicts with each other, which makes it hard for the electric vehicle supply devices to realize these two targets at the same time. Thus, in some embodiments, the central controllers 201 is configured to divide the ancillary service period into ancillary service providing time and battery charging time for each electric vehicle supply device. During the ancillary service providing time, the electric vehicle supply device works in AS Server mode, while during the battery charging time, the electric vehicle supply device works in Battery Charger mode, shown in FIG. 5.

Figure 5:
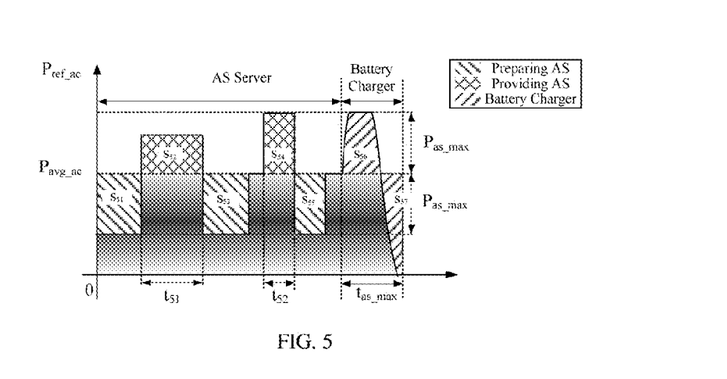
FIG. 5 shows two modes definition in one AS period.

The ancillary service includes ancillary service for system regulation up and regulation down. During the process of regulation up, the EVCS decreases the absorbed power, such that the frequency of the power grid decreases and during the process of regulation down, the EVCS increases the absorbed power, such that the frequency of the power grid increases. FIG. 5 shows the process of regulation down as an example. The central controllers 201 is configured to prepare for AS by storing more/less energy (storing more energy during the regulation up process, and storing less energy during the regulation down process) in the EV batteries during the intervals when the ancillary service order is zero. The AS period can be fixed in one system, such as 1 hour. Alternatively, this period may vary according to the different power grid protocols.

In some embodiments of the disclosure, the electric vehicle supply device can be unidirectional or bidirectional. Thus, the local controllers 202 comprise one or more controllers used for bidirectional EV supply devices and one or more controllers used for unidirectional EV supply devices. In one embodiment, as shown in FIG. 2, the local controller 202$_i$ is the controller used for bidirectional EV supply devices and the local controller 202$_j$ is the controllers used for unidirectional EV supply devices.

In one embodiment of the disclosure, the EVCS may further comprise several energy storage systems (ESSs), and each of them also is provided with a BMS. The ESSs are used to storage electric power and provide the power for the ancillary service when it is necessary. The ESS can be accumulator, battery or other suitable devices.

According to the embodiments in which the EVCS comprises ESS, the EVCS control system 200 further comprises a controller used for ESS. In one embodiment, the central controller 201 uses a closed loop control of active and reactive power with ESS to improve the power supply quality which is affected by power fluctuations at a point of common coupling (PCC), wherein PCC means that a point of the power grid which more than one loads connected to. The controller used for ESS can be located in the central controller 201 or be one of the local controllers 202. In one embodiment, the local controller 202$_k$ as shown in FIG. 2 is a controller used for ESS.

FIG. 3 is a diagram illustrating the central controller 201 according to an embodiment of the present disclosure. The central controller 201 comprises an upper level controller 3011 and one or more lower level controllers 3012. The upper level controller 3011 and lower level controllers 3012 can be modules of the central controller 201.

In the central controller 201, the upper level controller 3011 is configured to receive the ancillary service order from the power grid and distribute the ancillary service order to the one or more lower level controllers. The one or more lower level 3012 controllers are configured to communicate with the local controller 202. In some embodiments, each lower level 3012 controller corresponds to one or more local controllers.

The upper level controller 3011 also have the following functions, which comprise evaluating a required energy of batteries in each electric vehicle for charging and an available capacity for ancillary service, and distributing the ancillary service order to the plurality of 3012 for a plurality of electric vehicle supply devices according to a required energy of batteries in each electric vehicle for charging and the evaluated available capacity value for ancillary service.

Furthermore, the lower level controller 3012 are configured to divide an ancillary service period into ancillary service providing time and battery charging time for each electric vehicle supply device. In some embodiments, the one or more lower level controller 3012 are further configured to prepare for ancillary service by storing more/less energy in the batteries of the electric vehicles during intervals when the ancillary service order is zero in the ancillary service providing time. In some cases, the one or more lower level controllers are further configured to set a fixed time used for battery charging in every ancillary service period. The fixed time is a function of a final energy requirement by the customers, a state of charge (SOC) of battery, a maximum power capacity of electric vehicle supply device, and mathematical statistics of time length for the ancillary service in one ancillary service period.

Figure 4:
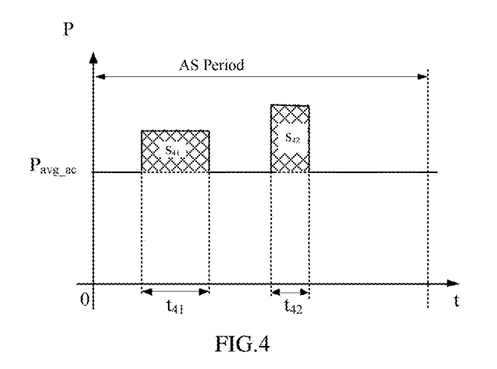
FIG. 4 is a diagram illustrating a schematic diagram of one AS period with providing ancillary services.

FIG. 4 is a diagram illustrating a schematic diagram of one AS period with ancillary service order. In the figure, $P_{avg\_ac}$ is the average power used for charging/discharging the batteries of one electric vehicle in AC side when there is no ancillary service order. $P_{avg\_ac}$ equals to the result of the required energy of batteries of one electric vehicle dividing the time length of the electric vehicle stayed in the EVCS. Normally the time length is input to the control system 200 by the electric vehicle's owner before the charging process. Furthermore, the areas of $S_{41}$ and $S_{42}$ schematically indicate the energy required by the ancillary service order in the time intervals $t_{41}$ and $t_{42}$, which can represent the positive power (shown in FIG. 4) or negative power.

FIG. 5 shows two modes definition in one AS period. It can be seen from FIG. 5, the ancillary service period is divided into ancillary service providing time and battery charging time for each electric vehicle supply device. During the ancillary service providing time, the electric vehicle supply devices work in AS server mode, while during the battery charging time, the electric vehicle supply devices work in battery charger mode.

In FIG. 5, $P_{as\_max}$ indicates the maximum value of ancillary service power. Normally, when the EVCS makes an agreement with the connected power grid, they will appoint a maximum value of ancillary service power for regulation. And there are two directions, one is up (i.e. the power is transmitted from the EVCS to the power grid), and another is down (i.e. the is transmitted from the power grid to the EVCS). Thus, $P_{as\_max}$ are predetermined, which represents the maximum value of ancillary service power for regulation up and regulation down respectively.

In one embodiment, the battery charging time $t_{as\_max}$ is fixed and predetermined by the power grid. In another embodiment, $t_{as\_max}$ is a function of a final energy requirement by the customers, a state of charge (SOC) of battery, a maximum power capacity of electric vehicle supply device, and mathematical statistics of time length for the ancillary service in one ancillary service period, wherein the SOC indicates the ratio between the charging capacity and the rated capacity of the battery, which is a percentage. However, for each electric vehicle, the $t_{as\_max}$ is fixed in one charging process.

In AS server mode, the EV supply device works as an AS server to follow ancillary service order. The ancillary service order changes according to power grid requirements, which should be followed by electric vehicle supply device in real-time. In some cases, taking the up direction as an example, the AS server mode can be divided into two parts.

When the ancillary service order ($P_{as\_ac}$) is zero, the electric vehicle supply device will prepare for AS by charging less energy (which is indicated as area $S_{51}$, $S_{53}$, $S_{55}$) to prepare for the coming ancillary service requirement. When the ancillary service order ($P_{as\_ac}$ is not zero, the electric vehicle supply device will follow the ancillary service order in real time supply, shown by area $S_{52}$ and $S_{54}$.

In one embodiment, the control system 200 is further configured to detect the feedback value of SOC, and output a signal to indicate the battery's SOC reaches or is out of range when SOC≥1 or SOC≤0.

If keeping on using AS Server mode for the whole AS period, the electric vehicle supply device can provide AS power in real-time response, but can't guarantee the energy storage required by the customer, because too much energy is used for ancillary service. Take AS regulation up as an example, in order to realize two targets above, electric vehicle supply device will change to battery charger mode during the last time ($t_{as\_max}$) of each AS period. The control system 200 will use battery charging energy close loop control to provide the energy required by the customer.

However, when the temperature changes a lot in different seasons, the battery capacity changes in a large range, for example the temperature dependent lead-acid battery. Based on this situation, the central controller 201 is configured to operate the electric vehicle supply devices at a de-rating operation mode. For example, when the ambient temperature<10° C., the operation power capacity of the electric vehicle supply device $P_{CAP}$ equals to 20% of the nominal capacity of the electric vehicle supply device, when the ambient temperature is larger than 10° C. and lower than 20° C., $P_{CAP}$ equals to 40% of the nominal capacity of the electric vehicle supply device, and when the ambient temperature is higher than 20° C., $P_{CAP}$ equals to the nominal capacity of the electric vehicle supply device. With this de-rating operation, we can protect the batteries of the electric vehicle, and extend its life length.

Figure 6:
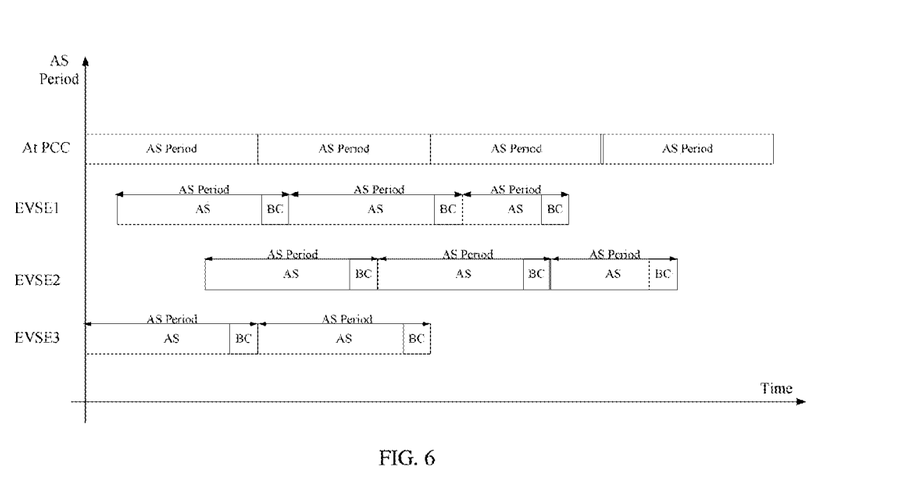
FIG. 6 shows AS periods of multiple electric vehicle supply devices when they arrive randomly according to an embodiment of the present disclosure.
Figure 7:
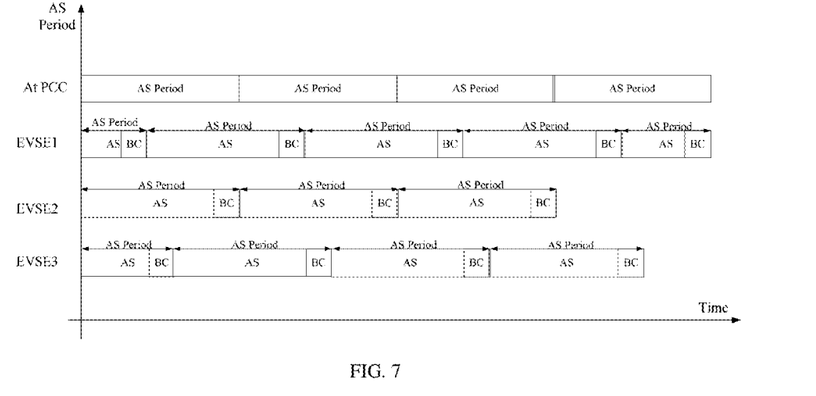
FIG. 7 shows AS periods of multiple electric vehicle supply devices when they arrive regularly according to an embodiment of the present disclosure.
Figure 8:
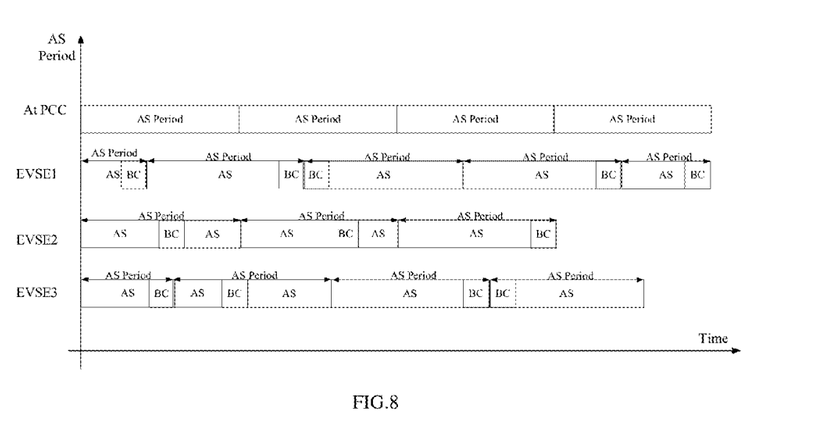
FIG. 8 shows AS periods of multiple electric vehicle supply devices according to another embodiment of the present disclosure.

FIGS. 6-8 shows AS periods of multiple electric vehicle supply devices according to embodiments of the present disclosure. In some embodiments, the ancillary service period is flexibly configured.

From FIGS. 6-8, it can be seen that the expected time normally comprises several AS periods and a fraction of one AS period. In these cases, AS period partition is used to distribute one electric vehicle parking time into multiple AS periods, which can help to realize the cycle use of one period EVCS control strategy, no matter how many AS periods the customer may stay.

As shown in FIG. 6, we can divide the customer parking time into multiple complete AS periods, and leave the rest of time as a non-complete AS period. This time period partition strategy takes the time when EV customer arrives as their own time base. When the electric vehicle random arrives in EVCS, the distribution of battery charger (BC) mode for multiple electric vehicle supply devices can be shown in FIG. 6. It can be seen that the battery charger (BC) mode for multiple electric vehicle supply devices randomly distribute, therefore this strategy can ensure that there are electric vehicles participating in the ancillary services at any time. This strategy is suitable for the electric vehicles arriving randomly.

On the order hand, if the electric vehicles regularly arrive in the EVCS without random characteristics, the algorithm in FIG. 6 can't guarantee that there are electric vehicles participating in the ancillary services at any time. In this case, we can define the time length of the first AS period as a random value which can't be a complete AS period, shown in FIG. 7. In this case, the BC mode of the multiple electric vehicle supply devices will not occur at the same time.

The two time period partition strategies in FIGS. 6 and 7 can guarantee the customer required energy storage by using BC in the last time of each AS period. But if the customer allows a limited error on the energy storage, the BC mode is also can be designed in the front or at middle of one AS period, instead of in the end of one AS period, shown FIG. 8.

In one embodiment, the electric vehicle supply devices can be unidirectional or bidirectional. The principle of control system used for uni-directional electric vehicle supply devices is the same with the control system used for bi-directional electric vehicle supply devices. The descriptions in this document mainly relates to the control system used for bi-directional electric vehicle supply devices. There is no difference between the control system used for uni-directional electric vehicle supply devices and the control system used for bi-directional electric vehicle supply devices. However, the control system should notice the hardware limits of uni-directional power direction, and change the power range setting from [$-P_{ac\_max}$, $P_{ac\_max}$] to [0, $P_{ac\_max}$].

As there are several chargers in the station with different capacities, the total capacity at the EVCS level is therefore the sum of those individual capacities. Furthermore, according to the AS rules of the power grid (regulation up or down, regulation up and down), the equations for calculating the AS capacity of EVCS ($P_{as\_up\_CAP\_EVCS}$, $P_{as\_down\_CAP\_EVCS}$) are different. Wherein regulation up or down means that all the electric vehicle supply devices work for regulation up or regulation down, however, regulation up and down means some electric vehicle supply devices work for regulation up, some for regulation down. The ancillary service capacity of EVCS can be determined as following, when the AS rules are regulation up (equation 1) or regulation down (equation 2):

$$P_{as\_up\_CAP\_EVCS} = \sum_{i=1}^{n} P_{as\_up\_CAP\_i} \quad (1)$$

$$P_{as\_down\_CAP\_EVCS} = \sum_{i=1}^{n} P_{as\_down\_CAP\_i} \quad (2)$$

Wherein, n is the total number of the EVSE, $P_{as\_up\_CAP\_i}$ is the ancillary service capacity used for regulation up of the ith electric vehicle supply device. $P_{as\_down\_CAP\_i}$ is the ancillary service capacity used for regulation down of the ith electric vehicle supply device.

The ancillary service capacity of EVCS can be determined as following, when the AS rules are regulation up and down:

$$P_{as\_up\_CAP\_EVCS} = \sum_{i=1}^{a} P_{as\_up\_CAP\_i} \quad (3)$$

$$P_{as\_down\_CAP\_EVCS} = \sum_{i=1}^{b} P_{as\_down\_CAP\_i} \quad (4)$$

Wherein, a is the number of the electric vehicle supply devices used for regulation up, and b is the number of the electric vehicle supply devices used for regulation down, and n is the total number of the electric vehicle supply devices, n≥a+b. $P_{as\_up\_CAP\_i}$ is the ancillary service capacity used for regulation up of the ith electric vehicle supply device, and $P_{as\_down\_CAP\_i}$ is the ancillary service capacity used for regulation down of the ith electric vehicle supply device.

Base on this ancillary service capacity of EVCS, the control system 200 can distribute the AS power reference at PCC into the electric vehicle supply devices in real time.

For example, when the ancillary service rule is regulation up and down, some electric vehicle supply devices work for regulation up, some for regulation down. For the electric vehicle supply devices working for regulation up, their real time distribution is carried out by the following equations.

$$P_{as\_up\_max\_i} = \sum_{i=1}^{a} \left( P_{as\_up\_max\_PCC} \times \frac{P_{as\_up\_CAP\_i}}{P_{as\_up\_CAP\_EVCS}} \right) \quad (5)$$

$$P_{as\_down\_max\_i} = 0$$

Wherein i=1, 2, . . . a, $P_{as\_up\_max\_i}$ is the maximum ancillary service capacity required for regulation up of the ith electric vehicle supply device, $P_{as\_up\_CAP\_i}$ is the ancillary service capacity available for regulation up of the ith electric vehicle supply device, $P_{as\_up\_max\_PCC}$ is the maximum ancillary service required for regulation up at PCC, and $P_{as\_up\_CAP\_EVCS}$ is the whole ancillary service capacity available for regulation up of the EVCS. $P_{as\_down\_max\_i}=0$ indicates that the ith electric vehicle supply device is only required for regulation up.

For the electric vehicle Supply devices work for regulation down, their real time distribution is:

$$P_{as\_down\_max\_j} = \sum_{j=1}^{b} \left( P_{as\_down\_max\_PCC} \times \frac{P_{as\_down\_CAP\_j}}{P_{as\_down\_CAP\_EVCS}} \right) \quad (6)$$

$$P_{as\_up\_max\_j} = 0$$

Wherein j=1, 2, . . . b, $P_{as\_down\_max\_j}$ is the maximum ancillary service capacity required for regulation down of the jth electric vehicle supply device, $P_{as\_down\_CAP\_j}$ is the ancillary service capacity available for regulation down of the jth electric vehicle supply device, $P_{as\_down\_max\_PCC}$ is the maximum ancillary service required for regulation down at PCC, and $P_{as\_up\_CAP\_EVCS}$ is the whole ancillary service capacity available for regulation down of the EVCS. $P_{as\_up\_max\_j}=0$ indicates that the jth electric vehicle supply device is only required for regulation down.

The real time distribution of ancillary service order ($P_{as\_PCC}$) for all the electric vehicle supply devices is as following:

$$P_{as\_ac\_i} = \begin{cases} P_{as\_PCC} \times \frac{P_{as\_up\_CAP\_i}}{P_{as\_up\_CAP\_EVCS}} & i = 1, 2 \dots a \\ P_{as\_PCC} \times \frac{P_{as\_down\_CAP\_j}}{P_{as\_down\_CAP\_EVCS}} & j = 1, 2 \dots b \end{cases} \quad (7)$$

Wherein $P_{as\_ac\_i}$ is the required ancillary service power from the ith electric vehicle supply device at AC side of the power grid, and $P_{as\_PCC}$ is the power required by ancillary service order in real time.

In some embodiments, since the electric vehicle supply device can not provide ancillary service when it works in "battery charger" mode, and the EV customers may random leave the EVCS without following their ancillary service order, the energy storage system (ESS) can be added into the EVCS, and the control system 200 correspondingly has a controller used for the ESS.

For example, the ESSs are used to control the power flow at the PCC Point, by using power close loop control to cover the loss of power when the electric vehicle supply device fails to provide enough AS power. The power reference $P_{ref\_ESS}$ of active power control loop is the ancillary service order at PCC, which is received from power grid in real time. If there are multiple ESS in the EVCS, the power references can be distributed as following:

$$P_{ref\_i} = P_{ref\_ESS} \times \frac{P_{CAP\_ESS\_i}}{\sum P_{CAP\_ESS\_i}}, \quad (8)$$

$$i = 1, 2, \dots n$$

$$Q_{ref\_i} = Q_{ref\_ESS} \times \frac{Q_{CAP\_ESS\_i}}{Q_{CAP\_ESS\_i}},$$

$$i = 1, 2, \dots n$$

Wherein $P_{ref\_i}$ is the active power reference of the ith ESS, $P_{ref\_ESS}$ is the active power reference of the control loop, $P_{CAP\_ESS\_i}$ is the capacity of the active power of the ith ESS, $Q_{ref\_i}$ is the reactive power reference of the ith ESS, $Q_{ref\_ESS}$ is the reactive power reference of the control loop, and $Q_{CAP\_ESS\_i}$ is the capacity of the reactive power of the ith ESS, and n is the total number of the ESSs.

Figure 9:
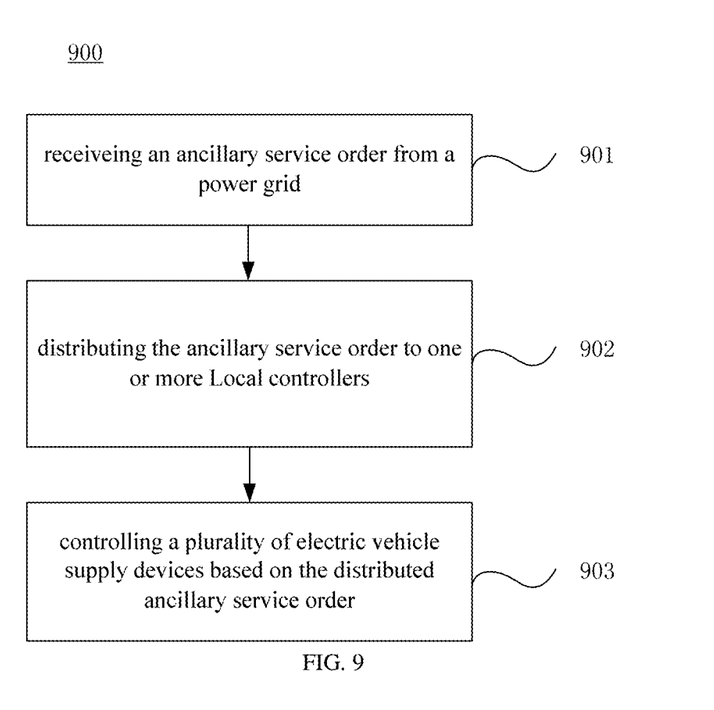
FIG. 9 is a diagram illustrating a flowchart of a method for controlling the EVCS according to an embodiment of the present disclosure.

FIG. 9 is a diagram illustrating a flowchart of a method 900 for controlling the EVCS according to an embodiment of the present disclosure. The method can be performed by corresponding controller.

At Step 901, the method 900 performs receiving an ancillary service order from a power grid. The ancillary service order will be updated for every ancillary service period. Wherein the ancillary service order defines the amount of electric power should be transmitted to/from a connected power grid. In some embodiments, Step 901 can be performed by the central controller in the EVCS control system.

At Step 902, the method 900 proceeds to distribute the ancillary service order to one or more lower level controllers periodically. In some cases, the method 900 should evaluate required energy of batteries in each electric vehicle and an available capacity for ancillary service. And Step 902 may further comprises distributing the ancillary service order to a plurality of electric vehicle supply devices according to the reburied power value of batteries in each electric vehicle and the evaluated available capacity for ancillary service. Furthermore, the available capacity for ancillary service comprises an available energy of the batteries in each electric vehicle and an available power of each electric vehicle supply device. In some embodiments, Step 902 also can be performed by the central controller in the EVCS control system.

At Step 903, the method 900 performs controlling a plurality of electric vehicle supply devices based on the distributed ancillary service order. Sometimes, the method 900 should perform taking the customers' demands as inputs, and the customers' demands comprise a willingness to participate in AS, an expected time to stay in the Charge Station, and the desired value of energy storage in the electric vehicle's batteries when customers leave. When performing Step 903, dividing the ancillary service period into ancillary service providing time and battery charging time for electric vehicle supply devices is sometimes necessary.

Figure 10:
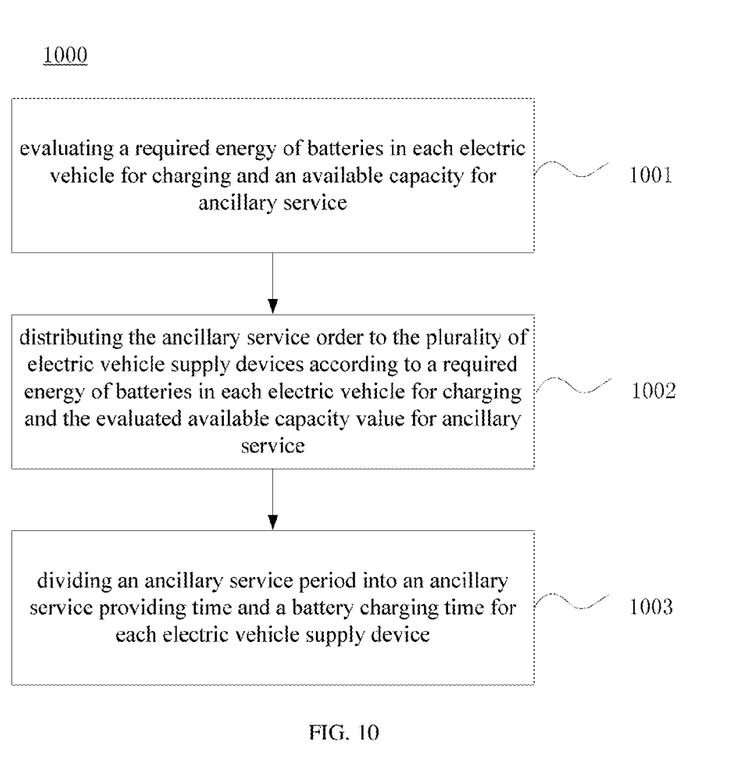
FIG. 10 is a diagram illustrating a flowchart of a method for controlling the EVCS according to another embodiment of the present disclosure.

FIG. 10 is a diagram illustrating a flowchart of a method for controlling the EVCS according to another embodiment of the present disclosure.

At Step 1001, a required energy of batteries in each electric vehicle for charging and an available capacity for ancillary service is evaluated. Then the method proceed to Step 1002, the ancillary service order is distributed to the plurality of electric vehicle supply devices according to a required energy of batteries in each electric vehicle for charging and the evaluated available capacity value for ancillary service. Wherein the available capacity for ancillary service comprises available energy of the batteries in each electric vehicle and available power of each electric vehicle supply device. Both of Steps 1001 and 1002 can be performed by the upper level controller of the central controller.

At Step 1003, the ancillary service period is divided into an ancillary service providing time and a battery charging time for each electric vehicle supply device. Step 1003 can be performed by the lower level controller of the central controller.

In one embodiment, the method further comprises: preparing for ancillary service by regulating energy in the batteries of the electric vehicles during intervals when the ancillary service order is zero in the ancillary service providing time.

In one embodiment, the method further comprises setting a fixed time used for battery charging in every ancillary service period.

In one embodiment, wherein the fixed time used for battery charging is a function of a final energy requirement by the electric vehicle' owners, a state of charge (SOC) of battery, a maximum power capacity of electric vehicle supply device, and mathematical statistics of time length for the ancillary service in one ancillary service period.

In one embodiment, the method further comprises considering the temperature dependence on battery capacity in different season by using EV supply devices de-rating operation.

In one embodiment, the method further comprises controlling the plurality electric vehicle supply devices with different communication protocols.

In one embodiment, the method further comprises using a closed loop control of active and reactive power with Energy Storage System (ESS) to improve the power supply quality which is affected by power fluctuations at a point of common coupling (PCC).

In one embodiment, the electric vehicle supply devices comprise be unidirectional electric vehicle supply devices and bidirectional electric vehicle supply devices.

It should also be noted that the above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A control system for an electric vehicle charging station (EVCS) including a plurality of electric vehicle supply devices including a first electric vehicle supply device, the plurality of electric vehicle supply devices being structured to charge a plurality of electric vehicles, the control system comprising:
    a central controller configured to receive an ancillary service order from a power grid structured to request ancillary service during an ancillary service period, generate a plurality of coordinated ancillary service orders including a first coordinated ancillary service order, and distribute the plurality of coordinated ancillary service orders to a plurality of local controllers including a first local controller;
    wherein the plurality of local controllers are each configured to control the plurality of electric vehicle supply devices in real time using the plurality of coordinated ancillary service orders so as to coordinate ancillary service to the power grid during the entire ancillary service period,
    wherein each coordinated ancillary service order includes an ancillary service providing time period and a battery charging time period, and
    wherein the ancillary service providing time period of the first coordinated ancillary service order includes a first time period during which the first local controller operates the first electric vehicle supply device so as to prepare for future ancillary service by regulating energy in a battery of an electric vehicle and a second time period during which the first local controller operates the first electric vehicle supply device so as to provide ancillary service following the first time period.

2. The control system according to claim 1, wherein the central controller is further configured to evaluate a required energy of batteries in each electric vehicle for charging and an available capacity for ancillary service.

3. The control system according to claim 2, wherein the central controller is further configured to distribute the plurality of ancillary service orders to the plurality of local controllers according to a required energy of batteries in each electric vehicle for charging and the evaluated available capacity value for ancillary service.

4. The control system according to claim 2, wherein the available capacity for ancillary service comprises an available energy of the batteries in each electric vehicle and an available power of each electric vehicle supply device.

5. The control system according to claim 1, wherein the ancillary service providing time period is flexibly configured.

6. The control system according to claim 1, wherein a sequence of the ancillary service providing time and the battery charging time in the first coordinated ancillary service order is flexibly configured.

7. The control system according to claim 6, wherein the battery charging time follows the ancillary service providing time or the battery charging time divides the ancillary service providing time.

8. The control system according to claim 1, wherein the central controller is further configured to set a fixed time used for battery charging in the ancillary service period.

9. The control system according to claim 8, wherein the fixed time is a function of a final energy requirement by customers, a state of charge (SOC) of battery, a maximum power capacity of the electric vehicle supply device, and mathematical statistics of time length for the ancillary service in one ancillary service period.

10. The control system according to claim 1, wherein the central controller is configured to operate the electric vehicle supply devices at a de-rating operation mode by considering a battery capacity based on an operation condition and a battery type.

11. The control system according to claim 10, wherein the operation condition comprises temperature and a life time of battery.

12. The control system according to claim 1, wherein the central controller is configured to use a closed loop control of active and reactive power with an energy storage system (EES) to improve power supply quality which is affected by power fluctuations at a point of common coupling (PCC).

13. The control system according to claim 1, wherein the central controller is located in a substation, or located in a master electric vehicle supply device of the plurality of electric vehicle supply devices, or located in a control room or on a control platform.

14. The control system according to claim 1, wherein the one or more local controllers take demands of customers as inputs, and wherein the demands of customers comprise at least one of: a willingness to participate in ancillary service, an expected time to stay in the EVCS, and a desired value of energy storage in batteries of the electric vehicles when customers leave.

15. The control system according to claim 1, wherein the central controller is configured to communicate with the plurality of local controllers with different communication protocols.

16. The control system according to claim 1, wherein the electric vehicle supply devices comprise unidirectional electric vehicle supply devices and bidirectional electric vehicle supply devices.

17. A method for controlling an electric vehicle charging station (EVCS) including a plurality of electric vehicle supply devices each structured to charge an electric vehicle, comprising:
receiving an ancillary service order from a power grid structured to request ancillary service during an ancillary service period;
generating a plurality of coordinated ancillary service orders using the received ancillary service order;
distributing the plurality of coordinated ancillary service orders to a plurality of lower level controllers periodically; and
controlling, in real time, a plurality of electric vehicle supply devices, with the plurality of lower level controllers, based on the plurality of coordinated ancillary service orders, so as to coordinate ancillary service during the entire ancillary service period;
wherein each coordinated ancillary service order includes an ancillary service providing time period and battery charging time period; and
wherein the ancillary service providing time period of one coordinated ancillary service order includes a first time period during which the lower level controller that received the one coordinated ancillary service order prepares for ancillary service by regulating energy in a battery of an electric vehicle and a second time period during which the lower level controller provides ancillary service.

18. The method according to claim 17, further comprising evaluating a required energy of batteries in each electric vehicle for charging and an available capacity value for ancillary service.

19. The method according to claim 18, wherein distributing the coordinated ancillary service orders to the plurality of lower level controllers periodically further comprises distributing the plurality of ancillary service orders to the plurality of electric vehicle supply devices according to a required energy of batteries in each electric vehicle for charging and the evaluated available capacity value for ancillary service.

20. The method according to claim 18, wherein the available capacity for ancillary service comprises an available energy of the batteries in each electric vehicle and an available power of each electric vehicle supply device.

21. The method according to claim 17, wherein the ancillary service providing time period is flexibly configured.

22. The method according to claim 17, wherein a sequence of the ancillary service providing time period and the battery charging time period in each coordinated ancillary service order is flexibly configured.

23. The method according to claim 22, wherein the battery charging time of one coordinated ancillary service order divides the ancillary service providing time.

24. The method according to claim 17, further comprising: setting a fixed time used for a battery charging in the ancillary service period.

25. The method according to claim 24, wherein the fixed time is a function of a final energy requirement by customers, a state of charge (SOC) of battery, a maximum power capacity of the electric vehicle supply device, and mathematical statistics of time length for the ancillary service in one ancillary service period.

26. The method according to claim 17, further comprising: operating the electric vehicle supply devices at a de-rating operation mode by considering a battery capacity based on an operation condition and a battery type.

27. The method according to claim 26, wherein the operation condition comprises temperature and a life time of battery.

28. The method according to claim 17, further comprising: using a closed loop control with an energy storage system (EES) to improve power supply quality which is affected by power fluctuations at a point of common coupling (PCC).

29. The method according to claim 17, further comprising:
taking demands of customers as inputs, wherein the demands of customers comprise at least one of: a willingness to participate in ancillary service, an expected time to stay in the EVCS, and a desired value of energy storage in batteries of the electric vehicles when customers leave.

30. The method according to claim 17, further comprising: controlling the plurality of electric vehicle supply devices with different communication protocols.

31. The method according to claim 17, wherein the electric vehicle supply devices comprise unidirectional electric vehicle supply devices and bidirectional electric vehicle supply devices.

* * * * *